Figure 4:
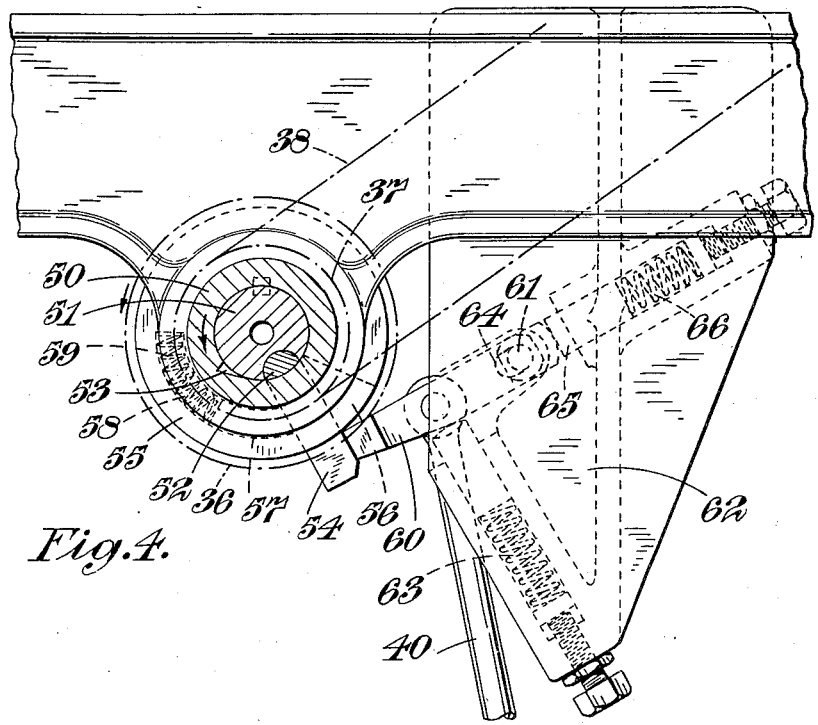

June 14, 1938.   A. G. ROSE   2,120,790
APPARATUS FOR DRAWING PLASTIC MATERIAL
Filed Nov. 16, 1937   3 Sheets-Sheet 1
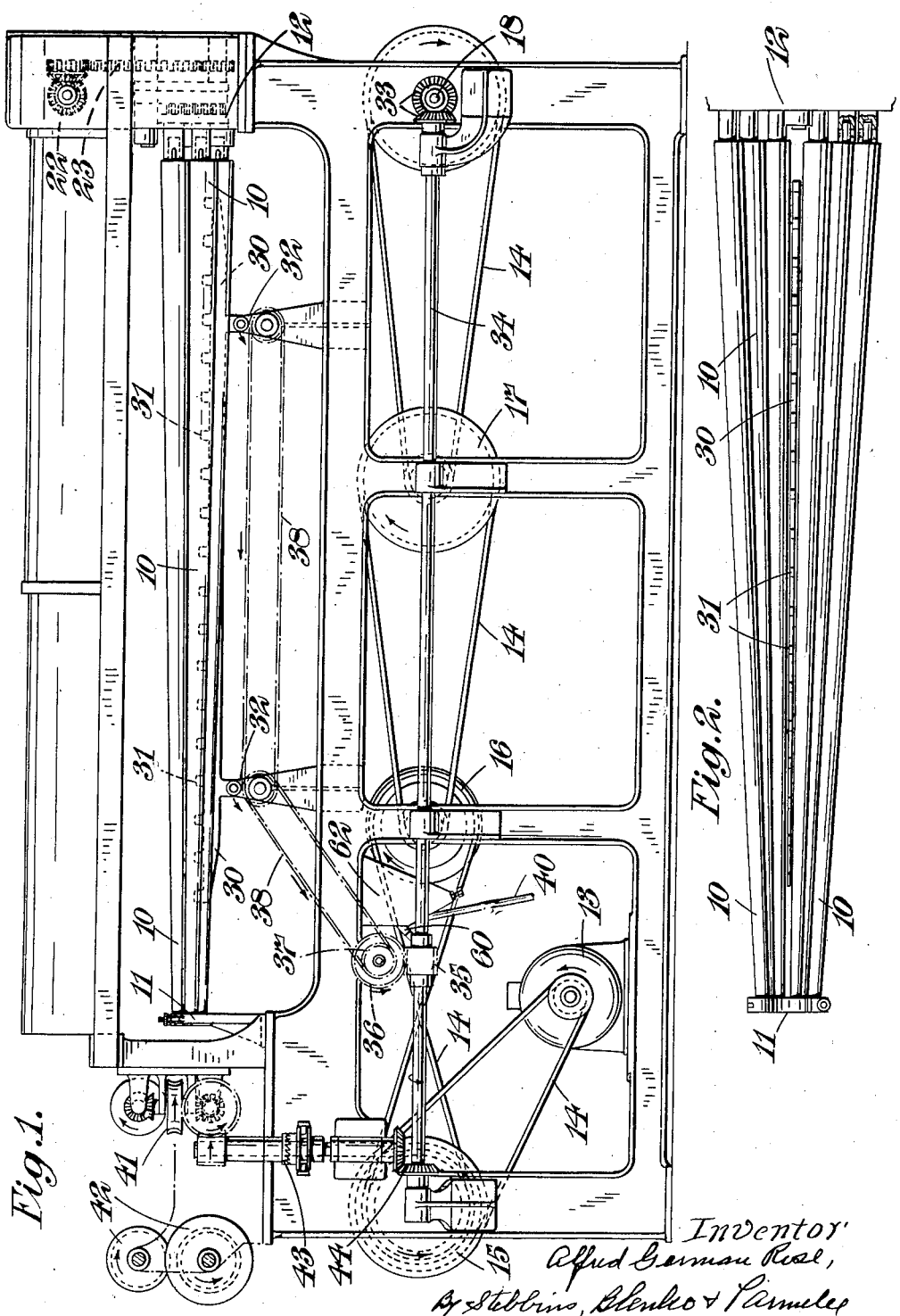

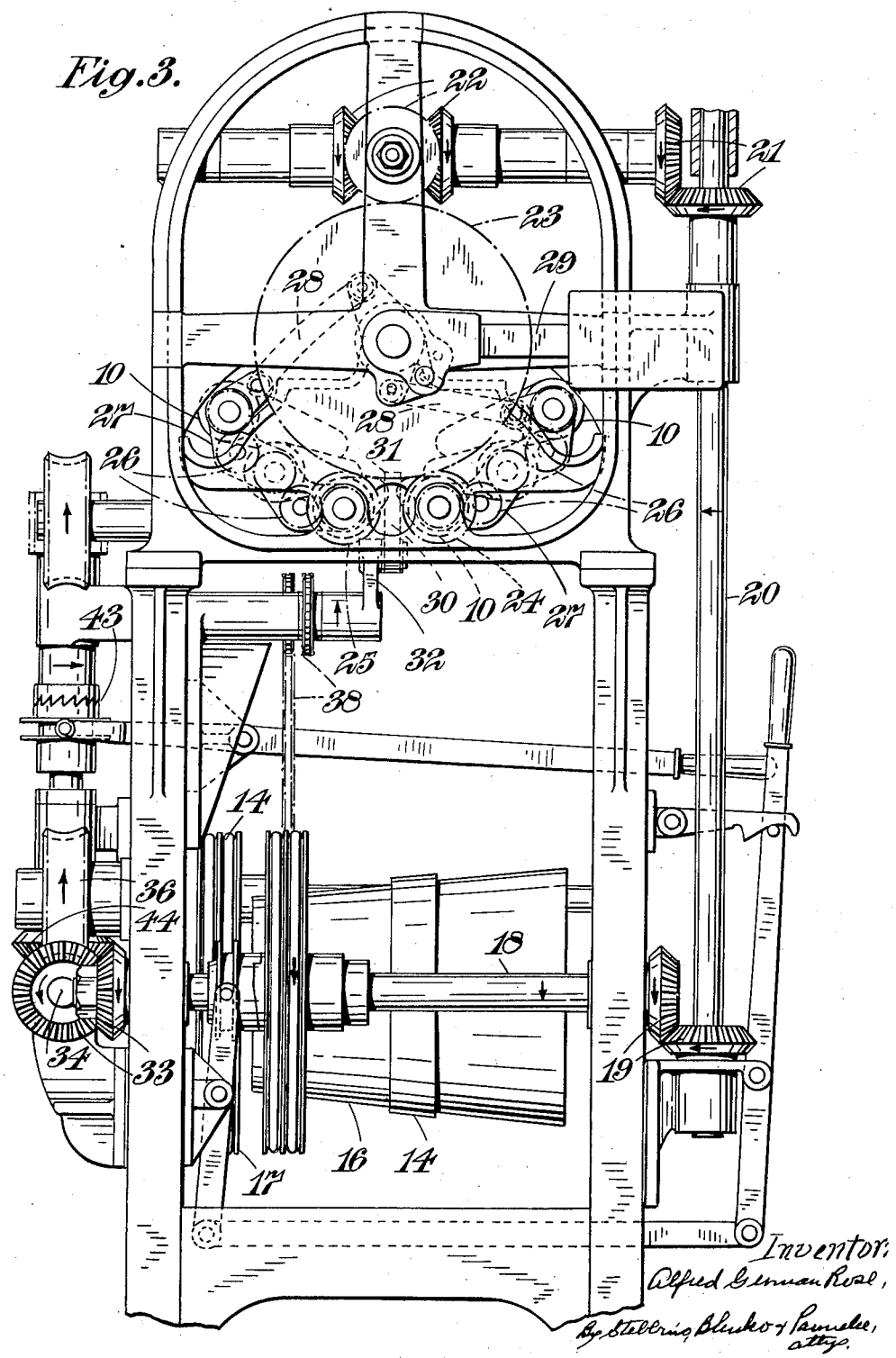

Patented June 14, 1938

2,120,790

UNITED STATES PATENT OFFICE 2,120,790

APPARATUS FOR DRAWING PLASTIC MATERIAL

Alfred German Rose, Gainsborough, England, assignor to Rose Brothers, (Gainsborough) Limited, Gainsborough, England, a British company Application November 16, 1937, Serial No. 174,891
In Great Britain November 17, 1936

6 Claims. (Cl. 107—10)

This invention relates to apparatus for reducing a large batch of plastic material such as toffee from an irregular dough to the form of a long cone from the narrow end of which the material may be fed as a bar for example to a cutting and wrapping machine.

The type of apparatus with which the invention is concerned is that comprising a plurality of long rollers (hereinafter referred to as batch rollers) located in proximity with their axes extending in the same general direction to form, for the reception of the batch, a cradle or trough, the cross-section of which is gradually reduced from end to end. In this type of apparatus the batch rollers are rotated simultaneously all in the same sense, each about its own axis, and usually first in one direction and then in the other, and by their turning action on the rough batch of plastic material, the latter is rolled into conical form.

This invention provides a batch rolling machine of the above type, having associated with the tapering cradle formed by the batch rollers a propelling device comprising a carrier or pusher which is operable at will, or automatically, and independently of the batch rollers, to move the batch of plastic material along the cradle towards the smaller end thereof.

Preferably the propelling device is in the form of a carrier located on the underside of the cradle and mounted for movement in a gap or gaps between the batch rollers, and means are provided for moving the carrier upwardly to lift the batch and longitudinally to carry it towards the smaller end of the cradle. In a convenient form the carrier is a parallel motion bar mounted for reciprocatory movement parallel to itself in a cycle comprising an upward movement to engage and lift the batch off the supporting surface of the batch rollers, a longitudinal movement towards the smaller end of the cradle to carry the batch towards that end, a downward movement to lower the batch and disengage from it, and a return longitudinal movement out of engagement with the batch to complete the cycle. The parallel motion carrier bar may have a length approximating that of the cradle and be mounted near its opposite ends on cranks, eccentrics or the like which are of the same throw and are rotatable simultaneously in the same sense.

In one construction the propelling device is normally inoperable but may be coupled at will to a continuously rotatable driving shaft by means of a clutch, which may be pedal-operated. Where the propelling device is in the form of a parallel motion carrier bar as described above, the clutch is so arranged that when operated to put the bar out of action it will disconnect the drive to the bar at that stage in the cycle of movement of the bar when the latter is out of engagement with the batch.

An example of a batch rolling machine according to the invention will now be described with reference to the accompanying drawings, in which:—

Figure 5:
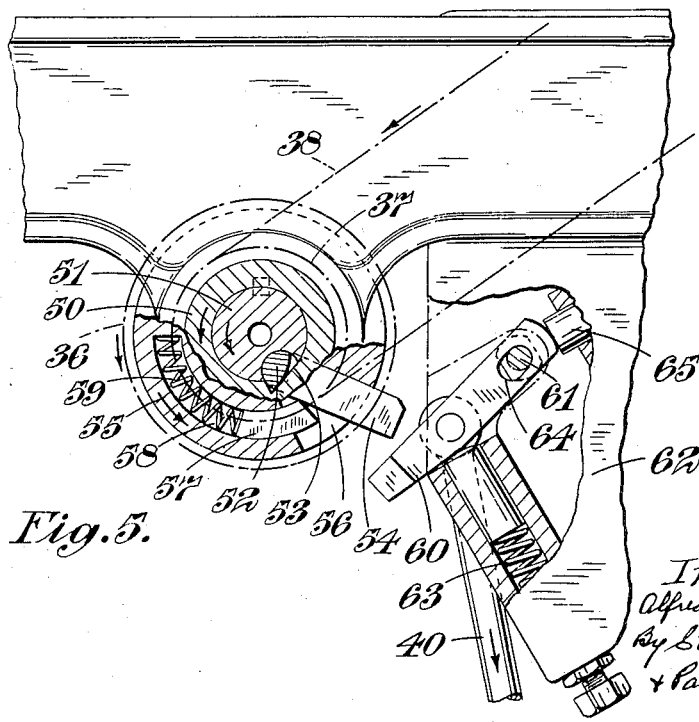

Figure 1 is a side elevation of the complete machine (the lower half of the cradle casing having been omitted for the sake of clearness), Figure 2 is a fragmentary plan showing the disposition of the batch rollers, Figure 3 is an end elevation looking on the larger end of the cradle and showing the drive to the batch rollers, and Figures 4 and 5 are side views, partly in section, showing the clutch mechanism for the propelling device in two different positions.

Like reference numerals indicate like parts throughout the drawings.

The machine illustrated is intended for the manipulation of toffee dough and comprises a long open-topped trough or cradle of conical shape formed by six batch rollers 10 arranged in an arcuate series with the axes of the rollers extending in the same general direction and tending towards a point. Each of the batch rollers 10 is itself of conical form, the corresponding big and little ends of all the rollers being located at the same ends respectively of the machine. The uppermost surfaces of the batch rollers constitute a support to receive the rough batch of toffee dough, and the arrangement is such that the lowermost portion of the supporting surface provided by the rollers is disposed approximately horizontally. The batch rollers 10 are supported at their opposite ends by bearings 11, 12 and at their big ends are driven through a gear train from the main driving mechanism of the machine. This mechanism comprises a motor 13 (Figure 1) from which the drive is taken by belting or the like 14 and intermediates 15, 16, 17 to a cross-shaft 18 and from thence by bevel gearing 19 (Figure 3) by way of a vertical shaft 20, bevel gearing 21 and reversing mechanism 22 to a large gear wheel 23 which meshes with pinions 24, 25 carried on the big ends of the two lowermost batch rollers. The drive to the outer batch rollers is transmitted by intermediate pinions 26. The arrangement is such that all the batch rollers are driven in the same sense, the direction of rotation being periodically reversed by the action of the reversing mechanism 22 (which forms no part of the present invention and need not, therefore, be described in detail) which operates automatically. By the action of the batch rollers 10 the toffee dough is kept in rotation, first in one direction and then in the other, and is gradually reduced to a symmetrical conical form.

The big ends of the outer batch rollers together with the intermediate pinions 26 are carried on brackets 27 which are movable through a small arc about the axes of the two lowermost batch rollers. Movement of the brackets 27 is controlled by links 28 and an operating lever 29. When the toffee dough is first placed in the cradle the brackets 26 are set at or near the outer limits of their adjustment, and later the brackets are drawn towards one another to reduce the compass of the cradle and thereby to reduce the size of the toffee cone.

The propelling device, which is the principal feature of this invention, comprises a long carrier bar 30 of approximately the same length as the cradle, which is mounted for movement in the gap between the two lowermost batch rollers. The carrier bar 30 tapers gradually throughout its length in order to accommodate it to the tapering gap between the two batch rollers. The carrier bar is furnished on its upper surface with a series of studs 31. The carrier bar is mounted near its opposite ends respectively on two cranks 32 of the same throw, which are adapted to be driven unidirectionally in the same sense from the main driving mechanism of the machine. The drive to the carrier bar cranks is taken from the cross shaft 18 by way of bevel gearing 33 to a longitudinal shaft 34 and thence, by worm and worm-wheel gearing 35, 36, through a clutch presently to be described, to a chain sprocket 37 from which the cranks are rotated by endless chains 38.

As indicated by the arrows in Figures 1 and 3 (which show the machine in the running condition with the propelling device also operating) the drive to the carrier bar cranks 32 is such that it will transmit to the carrier bar a reciprocatory movement parallel to itself in a cycle which consists of an upward movement, followed by a horizontal movement in a direction towards the small end of the cradle, then a downward movement and finally a return horizontal movement. During the upward movement of the carrier bar 30 the toffee batch is engaged and lifted clear of the supporting surface of the batch rollers; during the following horizontal movement of the bar the batch is carried a short way towards the small end of the cradle; the batch is then lowered again into the cradle by the following downward movement of the carrier bar; and during the completion of the cycle the bar returns out of engagement with the batch, to its initial position.

The clutch (see Figures 4 and 5) which is interposed between the worm-wheel 36 and chain sprocket 37 is controlled by a lever 40 and pedal (not shown) under the control of the machine attendant. Normally the pedal is in an elevated position, the clutch is out of action and the carrier bar 30 is in its lowermost position, out of engagement with the batch. When the pedal is depressed the carrier bar is brought into action and the toffee cone pushed up towards the narrow end of the cradle. From that end of the cradle the small end of the toffee cone is conveyed through two pairs of feed rollers 41, 42 from which it may be conveyed (directly or indirectly) as a rope to a toffee cutting and wrapping machine. The feed rollers 41 which are more fully described in my copending application, Serial No. 174,892, filed November 16, 1937, are driven through a clutch 43 by way of bevel gearing 44 from the longitudinal motor-driven shaft 34.

In practice, after the rough lump of toffee has been sufficiently reduced to a long cone, the carrier bar 30 will be brought into action to feed the cone towards and beyond the narrow end of the cradle, from which it may be passed through the first and second feed rolls 41, 42. Thereafter the carrier bar may be thrown out of and into action as may be required in order to keep the toffee stock fed continuously up to the rollers 41.

The clutch mechanism controlling the drive to the carrier bar and illustrated in Figures 4 and 5 will now be described. This comprises a driving sleeve 50 rotatable with the worm-wheel 36 which is continuously driven from the shaft 34, and a driven shaft 51 nested within the driving sleeve and carrying the chain wheel 37 by which the drive is transmitted to the carrier bar cranks 32. Driving engagement between the sleeve 50 and shaft 51 is effected by means of a key 52 located in a recess in the driven shaft and (in the driving position) projecting into engagement with a slot 53 in the driving sleeve. The clutch key 52 has a semi-cylindrical cross-section and the recess in the driven shaft is of corresponding cross-section, so that when the key is in register with the slot 53 it is capable of being rocked from the non-engaging position shown in Figure 4 into the engaging position shown in Figure 5. At one end the clutch key 52 carries a catch arm 54 extending outwardly in a radial direction with respect to the axis of the driven shaft. The driven shaft 51 also carries a disc 55 formed with a segmental slot 56 through which the catch arm 54 extends. A plunger 57 is located within an arcuate slot 58 in the disc 55 and is urged by a spring 59 against the catch arm 54, to constrain the latter towards a position in which the clutch key 52 is in engagement with the slot 53 in the driving sleeve. The clutch is adapted to be disengaged by means of a movable stop in the form of a short arm 60 mounted on a pivot pin 61 carried on a fixed frame 62 and operable by means of the pedal lever 40. The stop 60 is constrained, by means of a spring 63 towards a position (that shown in Figure 4) in which it will be in the path of the catch arm 54. Assuming that the carrier bar 30 is in action (with the driving and driven members and associated parts occupying the positions shown in Figure 5) and the pedal is released, the stop 60 will be forced upwardly by the spring 63 into a position (Figure 4) in which it will engage and arrest the catch arm 54 when the latter arrives at the position then occupied by the stop. On engagement between the stop and the catch arm the latter will be first rocked to disengage the clutch key 52 from the slot 53 in the driving sleeve (the catch arm being thereby brought up against the wall of the slot 56 in the disc 55) and thereafter further movement of the catch arm will be prevented. The driven shaft 51 will then be held against rotation and further movement of the carrier bar will thereby be arrested. The stop 60 is so located in the path of the catch arm that when brought into the arresting position it will effect disengagement of the clutch key at that stage in the cycle of movement of the carrier bar when the latter is in the lowered position, i. e. out of engagement with the toffee batch. The pivot pin 61 is received in a "lost-motion" slot 64 in the stop arm, and bearing on the end of the arm is a plunger 65 forced outwardly by a spring 66, the object of this device being to permit a small degree of resiliently controlled backward movement to the stop on engagement by the catch arm and so to prevent shock.

I claim:—

1. A batch rolling machine of the type described comprising in combination, a plurality of rotatable batch rollers located in proximity with their axes extending in the same general direction to form a tapering cradle for the reception of the batch, a propelling device in the form of a carrier located on the underside of the cradle and mounted for movement between batch rollers, and means for moving the carrier upwardly to lift the batch and longitudinally to carry it towards the smaller end of the cradle.

2. A batch rolling machine of the type described comprising in combination, a plurality of rotatable batch rollers located in proximity with their axes extending in the same general direction to form a tapering cradle for the reception of the batch, a propelling device in the form of a carrier located on the underside of the cradle and mounted for movement between batch rollers, and means for transmitting to the carrier a reciprocatory movement parallel to itself in a cycle comprising an upward movement to engage and lift the batch off the supporting surface of the batch rollers, a longitudinal movement towards the smaller end of the cradle to carry the batch towards that end, a downward movement to lower the batch and disengage from it, and a return longitudinal movement out of engagement with the batch to complete the cycle.

3. A batch rolling machine of the type described comprising in combination, a plurality of rotatable batch rollers located in proximity with their axes extending in the same general direction to form a tapering cradle for the reception of the batch, a propelling device in the form of a carrier which has a length approximating to that of the cradle and is located on the underside of the cradle for movement between batch rollers, crank-like elements of the same throw articulated to the carrier near its opposite ends and means for rotating said elements simultaneously in the same sense to impart to the carrier a reciprocatory movement parallel to itself in a cycle comprising an upward movement to engage and lift the batch off the supporting surface of the batch rollers, a longitudinal movement towards the smaller end of the cradle to carry the batch towards that end, a downward movement to lower the batch and disengage from it, and a return longitudinal movement out of engagement with the batch to complete the cycle.

4. A batch rolling machine of the type described comprising in combination, a plurality of rotatable batch rollers located in proximity with their axes extending in the same general direction to form a tapering cradle for the reception of the batch, a propelling device independent of the batch rollers and movable to engage the batch and to convey it along the cradle towards the smaller end thereof, operating mechanism for the propelling device, a continuously rotatable driving shaft, and a clutch operable at will to make and break a coupling between the driving shaft and the operating mechanism of the propelling device.

5. A batch rolling machine of the type described comprising in combination, a plurality of rotatable batch rollers located in proximity with their axes extending in the same general direction to form a tapering cradle for the reception of the batch, a propelling device in the form of a carrier located on the underside of the cradle and mounted for movement between batch rollers, parallel motion driving mechanism arranged, when operated, to transmit to the carrier a reciprocatory movement parallel to itself in a cycle comprising an upward movement to engage and lift the batch off the supporting surface of the batch rollers, a longitudinal movement towards the smaller end of the cradle to carry the batch towards that end, a downward movement to lower the batch and disengage from it, and a return longitudinal movement out of engagement with the batch to complete the cycle, a continuously rotatable driving shaft, and a clutch interposed between the driving shaft and the parallel motion driving mechanism aforesaid and operable at will to make and break a coupling between said shaft and driving mechanism, the clutch being so arranged that when operated to put the carrier out of action it will disconnect the drive to the carrier at that stage in the cycle of movement of the carrier when the latter is out of engagement with the batch.

6. A batch rolling machine of the type described comprising in combination a plurality of rotatable batch rollers located in proximity with their axes extending in the same general direction to form a tapering cradle for the reception of the batch, a propelling device independent of the batch rollers, means for operating said device to move the batch along the cradle towards the smaller end thereof, a continuously rotating driving sleeve, a driven shaft nested within the driving sleeve and coupled to the operating means for the propelling device, and clutch mechanism between the driven shaft and driving sleeve comprising a key recessed in the driven shaft and movable into and out of engagement with a cooperating slot in the driving sleeve, a catch arm extending radially from the key, a spring constraining the catch arm towards the engaging position of the key, and a stop movable at will into and out of a position in which it will arrest the catch arm and effect movement thereof to withdraw the key from engagement with the driving sleeve.

ALFRED GERMAN ROSE.